(12) United States Patent
Brigandi

(10) Patent No.: US 9,062,175 B2
(45) Date of Patent: Jun. 23, 2015

(54) ACETYLENE BLACK SEMICONDUCTING SHIELD MATERIAL WITH IMPROVED PROCESSING

(75) Inventor: Paul J. Brigandi, Highland Park, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 0 days.

(21) Appl. No.: 13/816,401

(22) PCT Filed: Sep. 16, 2011

(86) PCT No.: PCT/US2011/051987
§ 371 (c)(1),
(2), (4) Date: Feb. 11, 2013

(87) PCT Pub. No.: WO2012/040058
PCT Pub. Date: Mar. 29, 2012

(65) Prior Publication Data
US 2013/0178570 A1    Jul. 11, 2013

Related U.S. Application Data

(60) Provisional application No. 61/385,289, filed on Sep. 22, 2010.

(51) Int. Cl.
*C08F 36/02* (2006.01)
*C08K 3/04* (2006.01)
*C09C 1/54* (2006.01)

(52) U.S. Cl.
CPC ............... *C08K 3/04* (2013.01); *C01P 2002/72* (2013.01); *C01P 2002/77* (2013.01); *C01P 2006/10* (2013.01); *C01P 2006/19* (2013.01); *C01P 2006/40* (2013.01); *C09C 1/54* (2013.01)

(58) Field of Classification Search
CPC ......... C08K 3/04; C09C 1/54; C01P 2002/72; C01P 2002/77; C01P 2006/10; C01P 2006/19; C01P 2006/40
USPC ................. 252/500, 511; 429/34; 264/328.1; 526/352; 524/496, 562
See application file for complete search history.

(56) References Cited

U.S. PATENT DOCUMENTS

| | | |
|---|---|---|
| 3,296,189 A | 1/1967 | Eastman |
| 4,144,202 A | 3/1979 | Ashcraft et al. |
| 5,246,783 A | 9/1993 | Spenadel et al. |
| 5,556,697 A | 9/1996 | Flenniken |
| 5,725,650 A | 3/1998 | Flenniken et al. |
| 5,973,059 A | 10/1999 | Yamazaki et al. |
| 6,496,629 B2 | 12/2002 | Ma et al. |
| 6,714,707 B2 | 3/2004 | Rossi et al. |
| 7,128,996 B2 * | 10/2006 | Nishihata et al. ............. 429/508 |
| 8,119,033 B2 * | 2/2012 | Sakashita ...................... 252/511 |
| 2008/0157028 A1 * | 7/2008 | Nylander et al. ............. 252/511 |

FOREIGN PATENT DOCUMENTS

| | | | |
|---|---|---|---|
| EP | 0785239 | | 7/1997 |
| EP | 2075291 | | 7/2009 |
| JP | 2004/018652 | * | 1/2004 |
| JP | 2004018562 | | 1/2004 |
| JP | 2007112660 | | 5/2007 |
| WO | WO2008/047917 | * | 4/2008 |
| WO | 2009077804 | | 6/2009 |

OTHER PUBLICATIONS

Acetylene Black or other conductive carbon blacks in HV cable compounds; Probst et al.*
Carbon Black; Physics, Chemistry and Elastomer Reinforcement; Donnet et al. ; 2nd Edition; 1993, pp. 89-91.*
JP2004/018652—machine translation.*
Acetylene Black or other conductive carbon blacks; Probst et al.*
Carbon Black; Physics, Chemistry Elastomer Reinforcement; Donnet et al.; 2nd Edition; 1993, pp. 89-91.*
Denka Elastomer & Performance Plastic; Denka Black Density.*
International Search Report for PCT App. No. PCT/US2011/051987 mail on Dec. 27, 2011.
International Preliminary Report on Patentability for PCT App. No. PCT/US2011/051987 completed on Sep. 6, 2012.
Database WPI Week 200427 Thomson Scientific, London, GB, AN 2004-286749, XP002665219.

* cited by examiner

*Primary Examiner* — Liam J Heincer
*Assistant Examiner* — Marilou Lacap
(74) *Attorney, Agent, or Firm* — Whyte Hirschboeck Dudek S.C.

(57) ABSTRACT

A semiconducting shield composition comprising a polyolefin and acetylene black having at least one of the following properties: (a) a DBP oil adsorption of 150 ml/100 g to 200 ml/100 g; (b) an iodine absorption of 85 mg/g to 105 mg/g; (c) an apparent density of 0.2 g/ml to 0.4 g/ml; (d) a crystallite size along (002) less than 30 Å; and (e) a carbon-carbon bond length along (100) less than 2.42 Å. The semiconducting shield may be incorporated into a semiconducting layer and/or a semiconductor apparatus.

10 Claims, 1 Drawing Sheet

ACETYLENE BLACK SEMICONDUCTING SHIELD MATERIAL WITH IMPROVED PROCESSING

CROSS REFERENCE TO RELATED APPLICATION

The present application is the national phase of PCT Patent Application No. PCT/US2011/051987 filed Sep. 16, 2011, which claims priority to U.S. provisional patent application Ser. No. 61/385,289 filed on Sep. 22, 2010; the entire content of which is incorporated by reference herein.

BACKGROUND OF THE INVENTION

1. Field of the Invention

This invention relates to semiconductive shields for use in electrical conductors such as power cables that exhibit improved physical properties and processability compared to known semiconductive shields or insulation.

2. Description of the Related Art

Power cables typically include a core electrical conductor, an overlaying semiconductive shield, an insulation layer formed over the semiconductive shield, and an outermost insulation shield. The semiconductive shield used to screen the electrical conductor is conventionally formed by dispersing various furnace-type carbon blacks in an ethylene copolymer resin base. Commercially available high performance semiconductive shield compositions typically have a high viscosity due to the high carbon black loadings needed to achieve adequate conductivities. However, a high carbon black loading with high viscosity results in poor processing.

The surface smoothness of an extruded article can be improved by using carbon blacks with larger diameter particles or lower surface area. However, resistivity of carbon black based material is related to particle size. The larger carbon black particles result in higher, or poorer, resistivity. Hence, as particle size is increased in order to improve the surface smoothness, the resistivity of the material is increased to an undesirable level.

Acetylene black belongs to an intermediate class between graphite and amorphous carbon, and it has a large specific surface area and a stereostructure wherein primary particles are chained to one another. Acetylene black is carbon black of high purity, e.g., typically less than 1% based on weight of the composition of inorganic impurities, more typically less than 0.1% of inorganic impurities.

Acetylene black has been used in semiconductive shield applications but high loadings, e.g., above 37 weight percent, of it leads to the formation of acids in the extruder which can corrode and abrade the extrusion die tooling, resulting in equipment degradation and cable dimension variations over time.

Thus, there exists a need to improve the processing and conductivity at reduced carbon black levels of semiconductive shield materials.

SUMMARY OF THE INVENTION

In one embodiment the invention is a composition comprising (i) a polyolefin polymer and (ii) acetylene black having at least one of the following properties:
 (a) a DBP oil adsorption of 150 ml/100 g to 200 ml/100 g;
 (b) an iodine absorption of 85 mg/g to 105 mg/g;
 (c) an apparent density of 0.2 g/ml to 0.4 g/ml;
 (d) a crystallite size along (002) less than 30 Å; and
 (e) a carbon-carbon bond length along (100) less than 2.42 Å.

In one embodiment the invention is a composition comprising (i) a polyolefin polymer and (ii) an acetylene black having at least two of the properties of (a) to (e).

In one embodiment the invention is a composition comprising (i) a polyolefin polymer and (ii) an acetylene black having at least three of the properties of (a) to (e).

In one embodiment the invention is a composition comprising (i) a polyolefin polymer and (ii) an acetylene black having at least four of the properties of (a) to (e).

In one embodiment the invention is a composition comprising (i) a polyolefin polymer and (ii) an acetylene black having all five of the properties of (a) to (e).

In one embodiment the invention is a composition comprising (i) a polyolefin polymer and (ii) an acetylene black having the property (d).

In one embodiment the invention is a composition comprising (i) a polyolefin polymer and (ii) an acetylene black having the properties (d) and (a).

In one embodiment the invention is a composition comprising (i) a polyolefin polymer and (ii) an acetylene black having the properties (d), (a), and (b).

In one embodiment the invention is a composition comprising (i) a polyolefin polymer and (ii) an acetylene black having the properties (d), (a), (b), and (e).

In one embodiment the invention is a composition comprising (i) a polyolefin polymer and (ii) 30 to 40 weight percent based on the weight of the composition of an acetylene black.

In one embodiment the invention is an semiconducting layer of wire or cable comprising the composition.

In one embodiment the invention is a wire or cable comprising the semiconducting layer.

BRIEF DESCRIPTION OF THE DRAWINGS

The invention is described generally with reference to the drawings for the purpose of illustrating certain embodiments only, and not for the purpose of limiting the scope of the invention. In the drawings like numerals are used to designate like parts throughout the same.

DETAILED DESCRIPTION OF THE PREFERRED EMBODIMENT

Definitions

Figure 1:
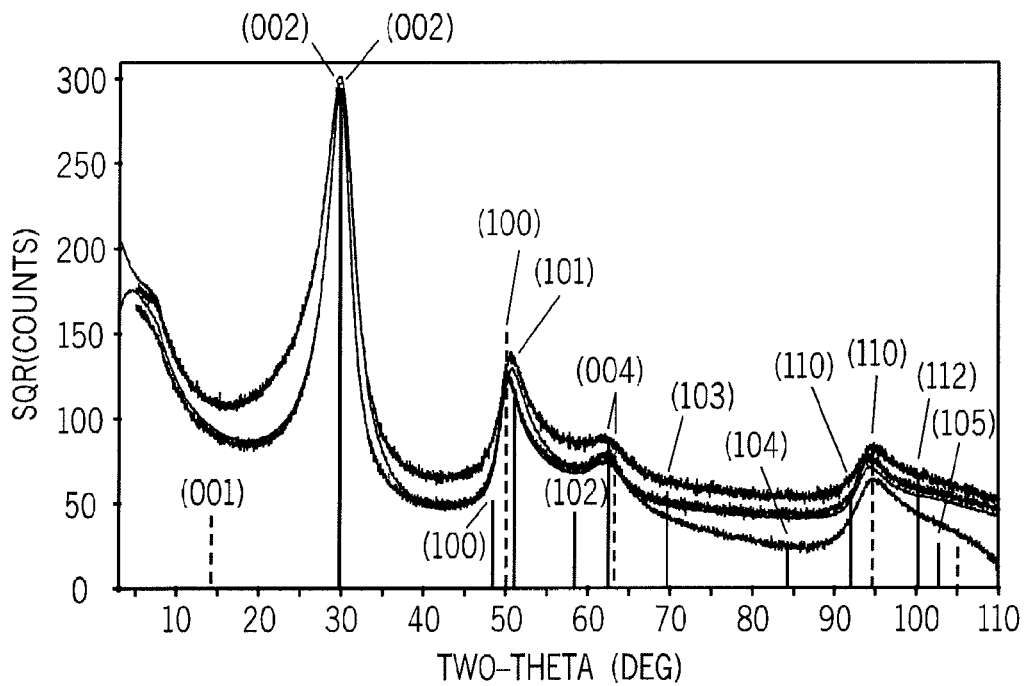
FIG. 1 is an X-ray diffraction pattern for acetylene black 1 and acetylene black 2.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of various components of the composition, the parameters of the process, and the like.

"Composition", "formulation" and like terms means a mixture or blend of two or more components. In the context of a mix or blend of materials from which a cable sheath or other article of manufacture is fabricated, the composition includes all the components of the mix, e.g., polypropylene, polyethylene co-polymer, metal hydrate and any other additives such as cure catalysts, antioxidants, flame retardants, etc.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below.

"Polyolefin", "PO" and like terms mean a polymer derived from simple olefins. Many polyolefins are thermoplastic and for purposes of this invention, can include a rubber phase. Representative polyolefins include polyethylene, polypropylene, polybutene, polyisoprene and their various interpolymers.

"Ethylene-based polymer" and like terms, means a polymer that comprises a majority weight percent polymerized ethylene monomer (based on the total weight of polymerizable monomers), and optionally may comprise at least one polymerized comonomer.

A "thermoplastic" material is a linear or branched polymer which can be repeatedly softened and made flowable when heated and returned to a hard state when cooled to room temperature. It generally has an elastic modulus greater than 10,000 psi (68.95 MPa) using the method of ASTM D638-72. In addition, thermoplastics can be molded or extruded into articles of any predetermined shape when heated to the softened state. An example of a thermoplastic material is thermoplastic polyurethane.

"Cable" and like terms mean at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

Semiconductive Shield Composition

This invention provides a composition for use in preparing semiconductive shields or layers, the composition comprising (i) a polyolefin and (ii) acetylene black with specific characteristics.

Component (i) is a polyolefin such as copolymers of ethylene and unsaturated esters with an ester content of at least about 5 percent by weight based on the weight of the copolymer. The ester content is often as high as 80 percent by weight. The preferred range of ester content is about 10 to 40 percent by weight. Examples of the unsaturated esters are vinyl esters and acrylic and methacrylic acid esters. The ethylene/unsaturated copolymers are usually made by conventional high pressure processes.

Examples of polyolefins are: polypropylene, polybutadiene, ethylene propylene copolymers, ethylene copolymerized with propylene and diener, copolymers of ethylene and alpha-olefin having 3 to 20 carbon atoms such as ethylene/octane copolymers, terpolymers of ethylene, alpha-olefin, and a diene, ethylene-butene, ethylene-octene, ethylene vinyl acetate, ethylene ethyl acrylate, or thermoplastic polyurethanes. The polyolefin may be present in an amount from 30 to 99.6 weight percent based on the weight of the composition.

The conductivity of carbon blacks is generally correlated to their morphological structure which can be characterized by different experimental paramethers, particularly by porosity, measured by means of dibutyl phthalate (DBP) oil absorption. Usually carbon blacks that have high DBP absorption values have high conductivity and are said to be "highly structured."

Acetylene black used in the invention has a DBP absorption value of 150 to 200 ml/100 g, typically 160 to 190 ml/100 g, and more typically 165 to 185 ml/100 g. The acetylene black an apparent density range between 0.2 and 0.4 g/ml, typically between 0.25 and 0.4 g/ml, and more typically between 0.28 and 0.36 g/ml. The acetylene black has an iodine absorption range between 85 and 105 mg/g, typically between 90 to 100 mg/g, and more typically between 92 to 96 mg/g.

Figure 2:
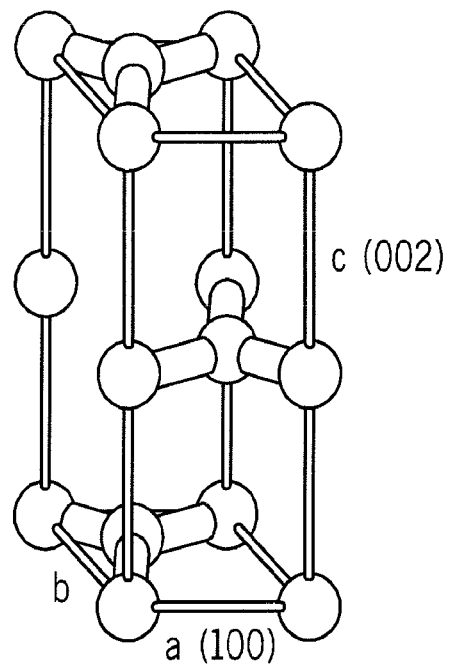
FIG. 2 is a three dimensional unit cell of graphite.

FIG. 1 displays the X-ray diffraction patterns for an acetylene black having an DBP absorption value between 150 and 200 ml/100 g. FIG. 2 is a representative unit cell diagram of graphite defining the (100) and (002) directions. The (002) refers to the stacking direction of graphitic sheets or layers. The crystallite size along (002) is obtained from the first peak of the X-ray diffraction pattern. The (100) refers to the distance between the two carbons in the graphitic unit cell and the C—C bond length is obtained from the second peak. The acetylene black of the current invention has a crystallite size along (002) less than 30 Å, and a C—C bond length along (100) less than 2.42 Å. The acetylene black may be present in an amount from 20 to 50 weight percent by weight of the composition.

Conventional additives, which can be introduced into the composition are exemplified by antioxidants, coupling agents, ultraviolet absorbers, stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers, crosslinking agents, boosters, and catalysts, and smoke suppressants. Additives and fillers can be added in amounts ranging from less than about 0.1 to more than about 50 percent by weight based on the weight of the composition.

Examples of antioxidants are: hindered phenols such as tetrakis[methylene(3,5-di-tert-butyl-4-hydroxyhydrocinnamate)]methane, bis[(beta-(3,5-ditert-butyl-4-hydroxybenzyl)-methylcarboxyethyl)]sulphide, 4-4'-thiobis(2-methyl-6-tert-butylphenol), and thiodiethylene bis(3,5-ditert-butyl-4-hydroxyl)hydrocinnamate; phosphites and phosphonites such as tris(2,4-ditert-butylphenyl)phosphate and ditert-butylphenyl-phosphonite; thio compounds such as dilaurylthiodipropionate, dimyristylthiodipropionate, and distearylthiodipropionate; various siloxanes; and various amines such as polymerized-1,2-dihydro-2,2,4-trimethylquinone, 4,4'-bis (alpha,alpha-demthylbenzyl)diphenylamine, and alkylated diphenylamines. Antioxidants can be used in amounts of about 0.1 to about 5 percent by weight based on the weight of the composition.

Processing aids may be included to the formulation for their known purposes. Thus, although processing aids are not necessary to achieve homogeneous blends and reduced viscosity, they may be added into the compositions of the present invention to further enhance these properties. For example, the processing aids may include, but are not limited to, polyethylene glycol, metal stearates such as zinc stearate and aluminum stearate, stearate salts, stearic acid, polysiloxanes, stearaminde, ethylene-bisoleyamide, ethylene-bisstearamide, mixtures thereof and the like. Processing aids, when incorporated into compositions of the present invention, are generally used in amounts from about 0.1 to 5 percent by weight, based on the total weight of the polymer composition.

The composition may further include a crosslinking agent, preferably in an amount of from 0.5 to 5 percent by weight, based on the weight of the composition. An organic peroxide is preferably used as a free radical generator and crosslinking agent. Useful organic peroxide crosslinking agents include, but are not limited to, di(tert-buylperoxyisopropyl)benzene, dicumyl peroxide, di(tert-butyl) peroxide, and 2,5-dimethyl-2,5-di(tert-butylperoxy)-hexane. Various other known coagents and crosslinking agents may also be used. For example, organic peroxide crosslinking agents are disclosed in U.S. Pat. No. 3,296,189, the entire disclosure of which is incorporated herein by reference.

Articles of Manufacture

Compounding can be performed by standard means known to those skilled in the art. Examples of compounding equipment are internal batch mixers, such as a Banbury or Bolling internal mixer. Alternatively, continuous single or twin screw mixers can be used, such as a Farrel continuous mixer, a Werner and Pfleiderer twin screw mixer, or a Buss kneading continuous extruder. The type of mixer utilized, and the operating conditions of the mixer, will affect properties of the composition such as viscosity, volume resistivity, and extruded surface smoothness.

A cable containing the semiconducting shield composition of the invention can be prepared in various types of extruders, e.g., single or twin screw types. A typical extruder has a hopper at its upstream end and a die at its downstream end. The hopper feeds into a barrel, which contains a screw. At the downstream end, between the end of the screw and the die, there can be a screen pack and a breaker plate. The screw portion of the extruder is considered to be divided into three sections, the feed section, the compression section, and the metering section, and two zones, the back heat zone and the front heat zone, the sections and zones running from upstream to downstream.

In one embodiment, the composition of this invention can be applied to a cable as a sheath or insulation layer in known amounts and by known methods (for example, with the equipment and methods described in U.S. Pat. No. 5,246,783 and U.S. Pat. No. 4,144,202). Typically, the composition is prepared in a reactor-extruder equipped with a cable-coating die and after the components of the composition are formulated, the composition is extruded over the cable as the cable is drawn through the die.

SPECIFIC EMBODIMENTS

Example Compositions

FIG. 2 is a representative unit cell diagram of graphite defining the (001) and (002) directions. Table 1 indicates the crystallite size and C—C bond lengths obtained from X-ray diffraction for Acetylene Black 1 and Acetylene Black 2.

TABLE 1

Crystallite size and C—C bond length of Acetylene Black 1 and 2

|  | Crystallite size along (002) (Å) | C—C bond length along (100) (Å) |
| --- | --- | --- |
| Acetylene Black 1 | 34 | 2.4300 |
| Acetylene Black 2 | 24 | 2.4114 |

Acetylene Black 2 has a DBP absorption value of 165 ml/100 g, an Iodine absorption (I2NO) of 94 mg/g, an apparent density of 0.316 g/ml.

DBP absorption is measured according to ASTM D2414-09a, Standard Test Method for Carbon Black-Oil Absorption Number (OAN). Density is measured according to ASTM D1513-05e1, Standard Test Method for Carbon Black, Pelleted-Pour Density. Iodine adsorption number is measured according to ASTM D1510-09b, Standard Test Method for Carbon Black—Iodine Adsorption Number.

Table 2 indicates the sample formulations for the Comparative Example, Example 1, and Example 2. All of the examples use an additive package including an antioxidant, a processing aid, and a crosslinking agent.

TABLE 2

Composition formulations of Comparative Example, Example 1, and Example 2

|  | Comparative Example (%) | Example 1 (%) | Example 2 (%) |
| --- | --- | --- | --- |
| Ethylene ethyl acrylate copolymer | 60.16 | 62.64 | 57.68 |
| Acetylene Black 1 | 37.75 | 0 | 0 |
| Acetylene Black 2 | 0 | 35.27 | 40.24 |
| Additive package | 2.09 | 2.09 | 2.09 |

The Comparative Example uses an Acetylene Black 1 and Examples 1 and 2 use an Acetylene Black 2. FIG. 1 displays the X-ray diffraction patterns for Acetylene Black 1 and Acetylene Black 2. A Bruker D-8 Advance θ-θ X-ray diffractometer, equipped with a cobalt sealed-tube source, a primary beam monochromator, and a Vantec-1 linear position sensitive detector, is used for collecting X-ray diffraction patterns. The tube is operated at 30 kV and 50 mA and the samples are illuminated with cobalt K-alpha 1 radiation (wavelength=1.78897 Å). X-ray diffraction data was collected from 5 to 100° (2θ) with a scan rate of 1.02°/minute and a detector window of 8°. The samples are rotated during data acquisition. Analysis of the resulting X-ray diffraction patterns is performed using JADE X-ray pattern analysis software V8.5. X-ray diffraction patterns are calibrated using Mo as an internal standard.

Process of Manufacture

The raw materials are compounded using a Farrel Model 1D Banbury batch mixer. Each batch weighing 38.1 lbs. is mixed for a total of 5.0 to 6.5 minutes until reaching an internal temperature of 165° C. The molten batches are discharged from the mixer into a Farrel 8"×4" melt fed single screw extruder having a 4" diameter 11 L/D metering section. The extruder is coupled to a Gala Model MUP-6 under water pelletizing system equipped with an 18×0.110" capillary die plate to produce the pelleted compound.

Peroxide is then added to the resulting intermediate, thermoplastic compound in 300 gram batches by the following procedure. The intermediate from compounding (300 g) is added to a glass jar and placed in a 65° C. oven for at least four hours. Peroxide is added to the pellets in the glass jar and rolled for 5 minutes. The jars are then placed back in the oven overnight (approximately 16 hours).

The pellets are then removed from the oven and pressed into 8"×8"×0.075" plaques for testing. The plaques are double pressed on a Grenerd hydraulic press. The press is preheated to 120° C. for the first pass at 300 psi low pressure for three minutes at 120° C. After three minutes, the mold is then quenched cooled for three minutes at the high pressure setting. The mold assembly is removed from the press, cut into four pieces using scissors, and stacked four pieces in the rebuilt mold assembly. The press is preheated to 120° C. for the second pass at 300 psi low pressure for three minutes at 120° C. The pressure is then increased to 2500 psi high pressure for fifteen minutes at 190° C. The mold is then quenched cooled for five minutes at the high pressure setting. The mold assembly is removed from the press.

Volume Resistivity, Capillary Rheology, and Extrusion Data

Volume resistivity testing is conducted on a crosslinked plaque according to ASTM D991. The data for the examples is in Table 3.

TABLE 3

Volume resistivity measured at 90° C.

|  | Comparative Example | Example 1 | Example 2 |
|---|---|---|---|
| Day 1 (ohm-cm) | 61.7 | 80.4 | 24.4 |
| Day 21 (ohm-cm) | 63.0 | 69.9 | 22.0 |

The volume resistivity data of Example 1 exhibits similar conductivity to the Comparative Example after 21 days. Example 2 has a much higher conductivity (lower resistivity) than the Comparative Example. Therefore, a sample with 38% acetylene black 2 would have a higher conductivity than the Comparative Example at the same loading and a volume resistivity between the values for Example 1 and Example 2.

The broader first peak in the X-ray diffraction pattern of the Acetylene Black 2 suggests that it is more exfoliated than Acetylene Black 1. While not wishing to be bound by theory, the higher conductivity at lower carbon black loading is believed to be a result of the more exfoliated graphitic structure of the Acetylene Black 2. The shorter bond length of the Acetylene Black 2 may also contribute to higher conductivity.

Capillary rheology simulates the flow behavior of a polymer melt under extrusion conditions in the high shear region. Testing is performed on a Rosand capillary extrusion rheometer. The Rosand rheometer is a dual barrel device that measures the melt viscosity at various high shear rates. The length to diameter ration of the rheometer is 16:1. Pistons are used to generate pressure on the melt samples that are in the barrel at a constant temperature. Testing is performed in constant rate mode to generate a desired shear rate. Testing is conducted at 135° C. to simulate typical maximum extrusion melt temperatures. Test results are shown in Table 4.

TABLE 4

Capillary rheology measured at 135° C.

| Comparative Example | | Example 1 | | Example 2 | |
|---|---|---|---|---|---|
| Shear Rate ($s^{-1}$) | Shear Viscosity (Pa·s) | Shear Rate ($s^{-1}$) | Shear Viscosity (Pa·s) | Shear Rate ($s^{-1}$) | Shear Viscosity (Pa·s) |
| 57.21 | 2719.61 | 67.42 | 975.97 | 56.45 | 1426.56 |
| 111.11 | 1916.64 | 130.96 | 832.37 | 109.64 | 1041.94 |
| 216.18 | 1339.59 | 254.78 | 682.26 | 213.32 | 837.88 |
| 420.75 | 922.57 | 496.89 | 554.59 | 415.18 | 677.83 |
| 819.31 | 611.41 | 965.61 | 438.44 | 808.45 | 562.94 |
| 1594.23 | 2719.61 | 1878.92 | 326.02 | 1573.12 | 445.69 |

The examples incorporating Acetylene Black 2 having a DBP 165 ml/100 g and crystallite size along (002) of 24 Å have a lower shear viscosity than the comparative example that uses Acetylene Black 1.

Extrusion properties including pressure and output are conducted with a pelleted compound on a Brabender extruder with a 20:1 L/D, ¾ inch diameter standard polyethylene metering screw. This test utilizes a 400 mesh screen pack through a 4 stranded die for 60 minutes. The pressure is recorded at the start and finish of each sample. The screen pack is changed for each sample during the delta P test. The temperature profile is 120° C., 120° C., and 125° C. from the feed zone 1 to zone 3, respectively.

The lower viscosity of Examples 1 and 2 resulted in significantly lower extrusion head pressure for experimental samples. Table 5 indicates extrusion pressure against time for each example. Example 1 and Example 2 resulted in 40% and 30% lower extrusion pressure than the Comparative Example, respectively. The lower structure of the modified Acetylene Black 2 is expected to lower the extrusion pressure. However, a 40% reduction in extrusion pressure is unexpected; especially in Example 2 containing over 40% acetylene black.

TABLE 5

Delta P extrusion head pressure over time at 30 RPM

| Head Pressure | Comparative Example | Example 1 | Example 2 |
|---|---|---|---|
| Start (psi) | 1797 | 1066 | 1330 |
| Finish (psi) | 1910 | 1004 | 1275 |

The output rate of the Examples 1 and 2, which include Acetylene Black 2, at varying RPMs is higher than the Comparative Example, which includes Acetylene Black 1, as shown in Table 6. Thus, compositions incorporating Acetylene Black 2 have a higher output rate than compositions using Acetylene Black 1.

TABLE 6

Extruder output (g/min) versus RPM

| Extruder Output (g/min) | Comparative Example (RPM) | Example 1 (RPM) | Example 2 (RPM) |
|---|---|---|---|
| 25 | 15.4 | 16.99 | 17.74 |
| 30 | 18.52 | 20.25 | 22.03 |
| 35 | 21.64 | 22.06 | 25.97 |

Acetylene black with a DBP absorption value of 165 ml/100 g and a crystallite size along (002) less than 24 Å significantly improves the conductivity and processing of semiconducting shield materials. A lower amount of acetylene black with a DBP absorption value 165 ml/100 g gave similar conductivity at a lower carbon black loading than the conventional shield materials. Acetylene black with a DBP absorption value 165 ml/100 g and a crystallite size of 24 Å unexpectedly results in suitable conductivity at lower carbon black loadings and improved extrusion processing than a sample of acetylene black with a DBP absorption value 174 ml/100 g and a crystallite size of 34 Å.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A cable comprising a semiconducting layer, the layer comprising a composition comprising (i) a polyolefin and (ii) acetylene black, the acetylene black having the following properties:
    (a) a DBP oil absorption of 160 ml/100 g to 200 ml/100 g;
    (b) an iodine absorption of 85 mg/g to 105 mg/g;
    (c) a crystallite size along (002) less than 30 Å;
    (d) a carbon-carbon bond length along (100) less than 2.42 Å; and
    (e) an apparent density of 0.2 g/ml to 0.4 g/ml.

2. The cable of claim 1, wherein the polyolefin polymer comprises from 30 wt % to 99.6 wt % of the composition.

3. The cable of claim 1, wherein the acetylene black comprises 30 wt % to 45 wt % of the composition.

4. The cable of claim 1, wherein the polyolefin is a thermoplastic polymer.

5. The cable of claim 1, wherein the polyolefin is an ethylene-based polymer.

6. The cable of claim 1, wherein the polyolefin is selected from at least one of ethylene-butene, ethylene-octene, ethylene ethyl acrylate, or combinations.

7. The cable of claim 1, wherein the polyolefin is ethylene ethyl acrylate copolymer.

8. The cable of claim 1, wherein the composition further comprises at least one of a processing aid, an antioxidant, or a crosslinking agent.

9. The cable of claim 1, wherein the composition comprises 30 to 40 weight percent, based on the weight of the composition, of the acetylene black.

10. An insulating layer comprising the semiconducting shield composition of claim 1.

* * * * *